July 7, 1970

R. H. VETTER 3,519,785

MULTIPLE GUN WELDER AND CONTROL APPARATUS

Filed Dec. 21, 1967

INVENTOR
Roland H. Vetter
BY
Burton & Parker
ATTORNEYS

United States Patent Office 3,519,785
Patented July 7, 1970

3,519,785
MULTIPLE GUN WELDER AND CONTROL APPARATUS
Roland H. Vetter, Birmingham, Mich., assignor to Warren Fastener Corporation, Mount Clemens, Mich., a corporation of Michigan
Filed Dec. 21, 1967, Ser. No. 692,492
Int. Cl. B23k 9/20
U.S. Cl. 219—98                                 5 Claims

ABSTRACT OF THE DISCLOSURE

This invention relates to a multiple welding gun control apparatus for operating a plurality of guns on a time sharing basis from a common welding controller and source of weld power having the capacity to operate a single gun or weld applicator unit.

The guns are effectively scanned for selective access to the system controller and power source through a series of time displaced or staggered windows developed by the scanner. The guns are normally blocked from system access except when a window opening is presented to a gun. If a gun is in a ready-to-weld or power requesting condition at the time its window is opened or presented to the gun, it gains access to the system, and the scanner is inhibited to maintain the window open for substantially the duration of the welding cycle for the accessed gun. Upon or near the completion of the welding cycle, the scanner is enabled to close the window for the accessed gun and to present subsequent windows to the successive guns, which have been interlocked or blocked from access to the system during the time that the generation of the windows has been interrupted.

SUMMARY OF THE INVENTION

The invention comprises a control apparatus for allocating a welding controller and transformer or source of power, having the capacity to operate a single welding applicator unit, to a plurality of selectively operable and conditionable applicator units on a time sharing basis. The control apparatus provides for each applicator unit a separately addressable accessing control that permits access of its conditioned applicator unit to the weld controller and power supply to the exclusion of all the other units for substantially the duration of the weld controller cycle. Addressing of the accessing controls is accomplished by scanning the several applicator units in a repetitive and predetermined order and at a rapid rate having a period considerably less than the duration of the weld controller cycle. An applicator unit, which is in a ready-to-weld or power requesting condition at its scanning time or the time allocated for its access to the system, is operatively connected through its accessing control to the welding power supply and weld controller.

Upon access of a unit, the scanner is inhibited until completion of at least the weld portion of the controller cycle, the other gun units being effectively locked out from gaining access to the weld controller and supply system. Upon completion of the welding cycle, as determined by the weld controller, the scanner is released to resume scanning and to enable access to the welding power supply and weld controller through the accessing control next responding to the scanning of its conditioned applicator unit.

As employed with a stud welding applicator unit equipped with automatic feeding means for feeding and loading a stud into a gun, the multiple gun control apparatus permits several guns to be operated from the same source and welding controller in time displaced welding cycles, but partially overlapping feeding cycles such that a welding cycle may be initiated for one gun during the feeding cycle of another gun that has just completed a welding cycle.

Since the several guns are operated from the same source of weld power, safety controls are provided to portect an operator of an inactive gun from possible shock hazards while an accessed gun is drawing power from the system.

BACKGROUND OF THE INVENTION

The invention is applied to a drawn or transfer arc welding system of the type employed for stud welding a metallic fastener or stud to a workpiece. Such welders are characterized by drawing a pilot arc of relatively low current intensity as the stud is retracted from the workpiece by energization of a stud lift coil in the stud applicator tool or gun. The pilot arc ionizes and lowers the resistance of the arc path through which the subsequently initiated higher intensity weld current is passed or transferred as or before the stud is plunged back toward the workpiece upon the timed de-energization of the stud lift coil from the weld controller. Upon initiation of the high intensity weld current through the ionized arc path, the output of the supply source or transformer decreases to substantially its short circuit or zero voltage drop producing value, causing it to supply substantially all of its power through the established arc path, whereby another arc path cannot be readily established from the same source of power and controlled from the same weld controller to supply controlled weld current to more than one gun at the same time.

Accordingly, it has been necessary heretofore to employ a separate complete welding station, including an independent source of weld energy or welding supply and controller, for each applicator unit, with consequent increase in the capital equipment investment and no essential savings in the per unit cost of welding a stud as the number of welding stations is increased.

In such prior systems, the several welding machines, essentially of the transformer variety, are connected in parallel to the power mains or lines. Severe line loading results when the several stations are drawing weld power at the same time, causing a serious reduction in the voltage of the power mains that affects the weld energy and the quality of the weld.

The invention thus far as its basic purpose and object to reduce the capital equipment investment and operating cost of this type of equipment.

A specific object is to provide a multiple gun control apparatus permitting several welding guns to be operated on a time sharing basis from the same weld controller and welding supply source of a power capacity for operating a single welding unit.

A related object is to provide a multiple gun control apparatus in accordance with the foregoing objects without duplication of major components and creating any noticeable interference to the operation of the several welding guns or applicator units.

Another object is to provide a multiple gun welding control apparatus in accordance with the foregoing that distributes the weld loads or power demand from or on the system mains on a timing basis and without loading beyond that normally produced by a single gun or weld applicator unit.

Another object is to provide a multiple gun welding control apparatus operable with and using logic type circuit elements.

Still another object is to provide a multiple gun control apparatus in accordance with the foregoing that provides rapid access to the system for the first gun to request power therefrom and thereafter permits a predetermined order of accessing of the subsequent guns to the system.

Yet another object is to provide adequate safety precautions for the protection of the operators from possible shock hazards resulting from operating multiple guns from a single or common source of weld power.

Another object is to provide apparatus in accordance with the foregoing for a drawn arc stud welding system.

Another object is to provide a multiple gun welding and feeding control apparatus that permits several guns to be operated from the same source of weld power and weld controller in time displaced welding cycles but overlapping feeding cycles, such that a welding cycle may be initiated for one gun during the feeding cycle of another gun that has just completed a welding cycle.

The invention both as to its organization, structure and operation together with other aspects, features and objects thereof will be explained more fully with reference to the accompanying description and drawings, wherein:

Although the principles of the invention are considered to be applicable to other forms of welding, sources of weld energy, and controllers, the invention will be described and illustrated in connection with a drawn arc welding controller such as the commercially available transfer arc Class 8992 (Type EQ–2227–G1) Stud Welder Controller, manufactured by the Square D Company of Milwaukee, Wis. Such apparatus is suitable for operating a stud welding gun applicator tool that may partake of the character of those disclosed in U.S. patent applications Ser. No. 369,115, filed May 21, 1964, and Ser. No. 485,007, filed Sept. 3, 1965, for Welding Apparatus, of common ownership herewith.

Figure 1:
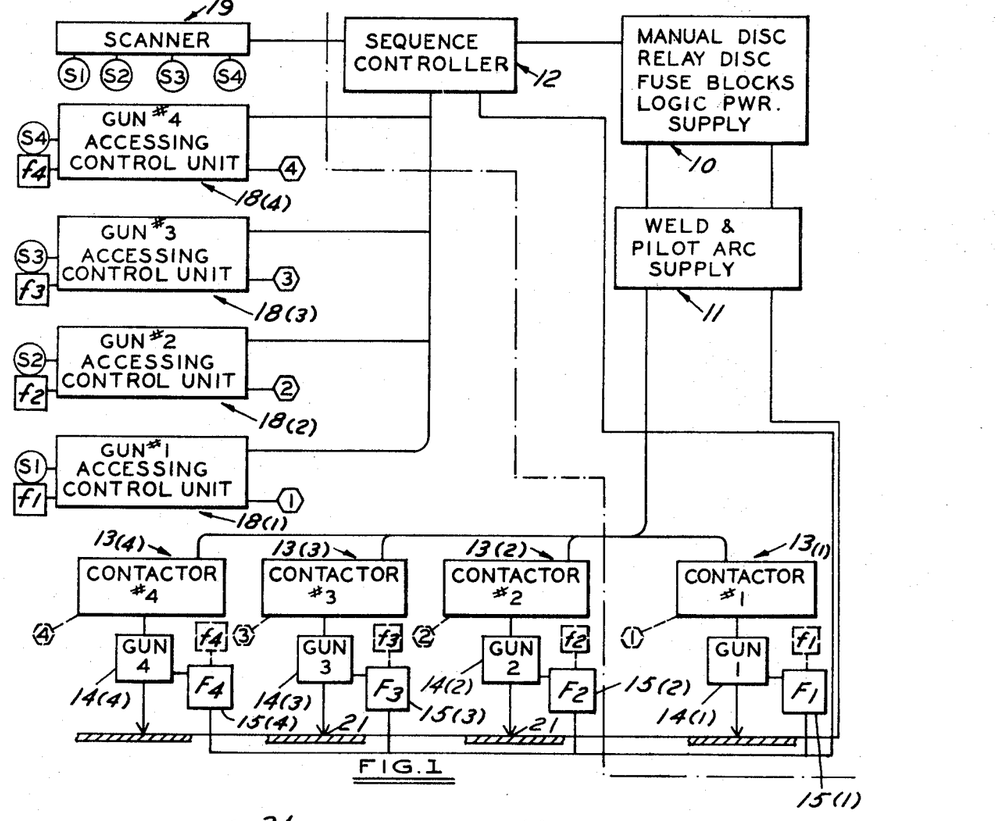
FIG. 1 is a simplified block diagrammatic representation of the general organization of the multiple gun control apparatus of the present invention for a welding power supply and controller.

The principal components of such a welder controller are included in FIG. 1 and comprise a disconnect power section 10, a transformer section 11 including the main weld transformer and pilot arc transformer, the welder controller 12, and a contactor panel 13 through which pilot arc and weld current are supplied to a gun 14 under the control of the controller. Component 15 represents a feeder controller for an automatic feeder apparatus that transfers and feeds a stud from a feed hopper (not shown) to be loaded in position in the gun.

Figure 3:
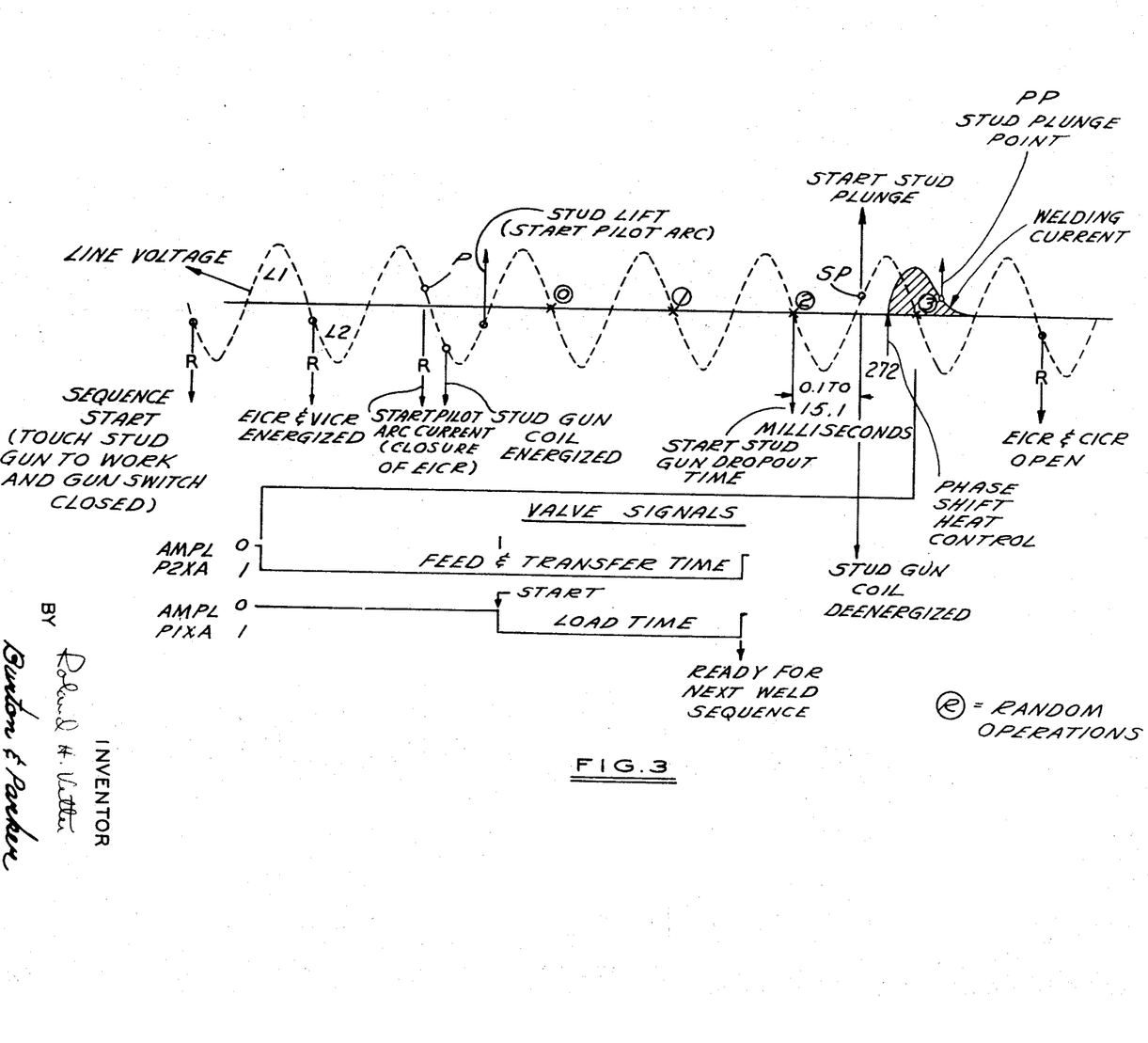
FIG. 3 represents the sequence of operations and functions related to the line frequency, as developed by and provided from the welder controller for which the multiple gun control apparatus of the present invention is provided.

The welding controller provides a plurality of control functions or events, some of which have random initiation times and relative occurrences but all of which occur in a predetermined sequence referenced to the line voltage frequency as indicated in FIG. 3 herein. These events include the energization of the magnetic relay disconnect of the power section and the sequence initiation relay of the controller, the starting of a pilot arc current through the gun, the energization and the subsequent timed drop out of the gun lift coil, the initiation of the flow of welding current, and the deenergization of the relay disconnect. These several functions constitute what may be termed the electrical or weld cycle of the welder controller, starting with the energization of the magnetic power disconnect contacts from the closure of the trigger switch on a gun with a stud in place and touching the work, and extend over a period of several alternations of the 60-cycle line frequency to constitute an operational cycle for this form of welding controller of, say, approximately one-tenth second duration, subject to some variation by the randomly initiated operations of some of the events thereof.

The total cycle time measured from the time a welding sequence is started for completing a weld from a gun to the time that that gun is ready for the next weld sequence is shown in FIG. 3 as including the operational cycle of the weld controller and that of the feeder controller. The feeder cycle is initiated at or near the completion of the weld cycle and includes the time required to feed and transfer a stud from a remote feed hopper to the gun and to load a stud into position in the gun. The feed and transfer time and the stud load time may extend the total cycle time of a gun close to one second or more in duration, depending upon the distance of the feeder from the gun, the size of the stud and the mechanical characteristics of the loading device on the gun.

The relay or power contactor for operating the line disconnect power contacts is energized approximately one cycle of the line voltage variation after the stud touches the work and the gun trigger switch is closed. Approximately another cycle of the line voltage variation elapses due to the mechanical delay in contact operation before the power contacts close to connect the weld transformer and pilot arc transformer to the line. The pilot arc transformer is connected to a full wave rectifier from which rectifier current is supplied to the gun while the stud is still against the work.

The energization of the gun lift coil from the gun lift power supply circuit is delayed slightly until after the start of pilot arc current by a sequence delay relay that is energized with the power disconnect relay and prevents the gun lift coil from being energized to start the stud retraction immediately with the pilot arc current. With pilot arc current flowing through the stud contacting the work, the subsequent energization of the gun lift coil retracts the stud from the work and establishes an arc path for the pilot arc current.

The welding controller includes a cycle counter and zero referencing or synchronizing circuit that starts the counting of the A.C. line cycles at the first zero crossing point of the line voltage as it passes from a positive to a negative alternation, indicated at the point 0 in FIG. 3 after the start of pilot arc current. At the cycle count of "2" from the counter, a gun coil drop-out timing circuit contained in the welder controller is activated to time the drop out of the de-energization of the gun lift coil, that takes from, say, approximately 0.1 to 15.1 milli-seconds, depending upon the mechanical characteristics of each particular gun. After the timing circuit has timed out, the gun coil is de-energized to plunge the stud, driven by a spring in the gun, toward the workpiece.

A phase shifted signal, which is developed by a phase shift heat control circuit contained in the welder controller, is supplied at a time just after that corresponding to the 2½ count status of the counter to a gate firing circuit contained in the contactor panel. The gate firing circuit fires the main weld SCR contained in a secondary line of the weld transformer to pass the weld current to the stud electrode terminal of the gun. The phase shift heat control circuit is adjustable to provide the precise amount of welding current between the stud and the workpiece to form a secure weld without overheating and damaging the stud or workpiece and effectively controls the conduction angle of the main weld SCR. The weld current SCR is turned on from the SCR gate firing circuit to allow weld current, derived during the indicated half cycle or alternation of the line voltage, to flow from the stud through the ionized path developed by the pilot arc to the workpiece. The start of the flow of the weld current has been delayed or shifted under the control of the phase shift heat control circuit from the start of the first positive alternation of line voltage occurring after the 2 count from the counter or corresponding to a count of 2½ cycles from the point 0. The welding current is shaped by an inductor which is in series with the secondary line and continues the directional flow of weld current by discharging the inductive energy stored therein through the stud after the stud has contacted the workpiece at the stud plunge point.

At the cycle count of 3, an end of weld sequence pulse from the counter causes the de-energization of the power disconnect and is also applied to the feeder controller. The feeder controller controls an automatic feeder associated with the gun to feed and load another stud in place in the gun upon completion of the feeder cycle, the electrical circuitry of the weld controller is reset in preparation for another weld cycle from the loaded gun.

In accordance with the invention, the weld controller and weld transformer are made available on a time sharing basis to a multiplicity of guns or weld applicator units as shown in FIG. 1, by provision of a separate accessing control 18(1–4) for each gun unit, a separate contactor 13(1–4) for each gun unit, and a scanner 19 which effectively addresses or scans the several gun units through their respective accessing controls. A gun that is in condition to weld, i.e., requesting weld power, at the time its accessing control is addressed, is accessed or connected thereby to the weld controller, and the contactor for only that gun is selected or is conditioned for connection to the weld transformer and the pilot arc supply.

The control apparatus makes the gun lift power supply, the gun lift drop-out timing circuit and the phase shift heat control section of the weld controller available to several guns, each possessed of different coil drop-out time characteristics and different heat capability peculiar to each gun. Those components of the weld controller gun lift coil drop-out circuit and the phase shift heat control section, which control or provide the setting of the drop-out time and the percent heat control or weld current, are duplicated and made available for each gun in its own accessing or gun control section 18 for selective independent insertion in the gun lift drop-out circuit and the phase shift heat control section of the weld controller through the accessing control of a gun when it has been accessed to the weld controller and weld transformer to the exclusion of the other gun units. The invention makes available on a timing basis the same weld power source, pilot arc supply source, gun lift coil energizing source and drop-out timing circuit, and phase shift heat control circuit to a multiplicity of guns, at different times.

While a common feeder controller could be employed in a slower acting system, the feeder controller is not time-shared in the present embodiment of the invention in which separate feeder controllers are provided for each gun. The use of separate feeder controllers enables the multiple gun control apparatus to operate the several guns in time displaced, but partially overlapping, total cycles in which a welding cycle may be initiated for one gun while a feeding cycle is simultaneously taking place for another gun or guns that has or have completed their separate welding cycles. Thus, the number of welding operations that may be made over a given period of time is significantly increased.

Figure 6:
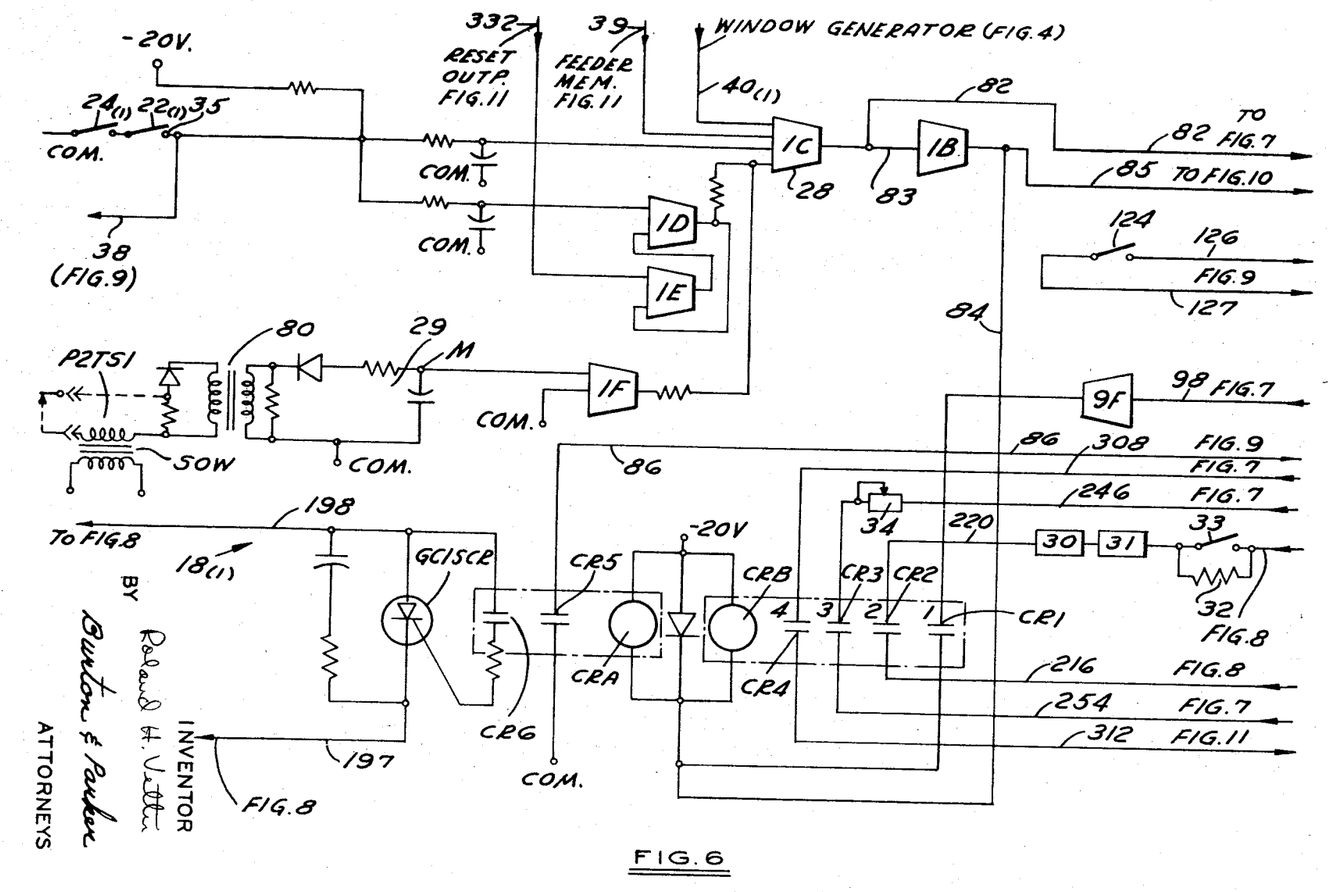
FIG. 6 is a schematic electrical circuit of a representative one of the accessing controls or gun control modules of the multiple gun control apparatus of the present invention.

A representative of one of the gun accessing controls 18, also called a gun control module, is shown in FIG. 6, four of such controls being shown in the four gun embodiment of the invention depicted herein. The number of guns illustrated, however, is not to be taken in a limiting sense, but to be determined instead by such factors as the duty cycle and thermal limit capability of the weld transformer and the relationship between the number of welding operations imposed or required of a gun in a specified period of time and the maximum duration of the entire electrical welding or welding controller cycle.

Figure 2:
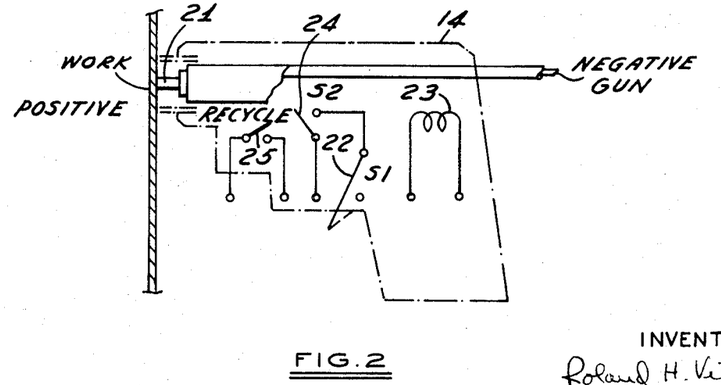
FIG. 2 is a representation of a stud welding gun or applicator unit indicating the basic electrical control elements associated therewith.
Figure 10:
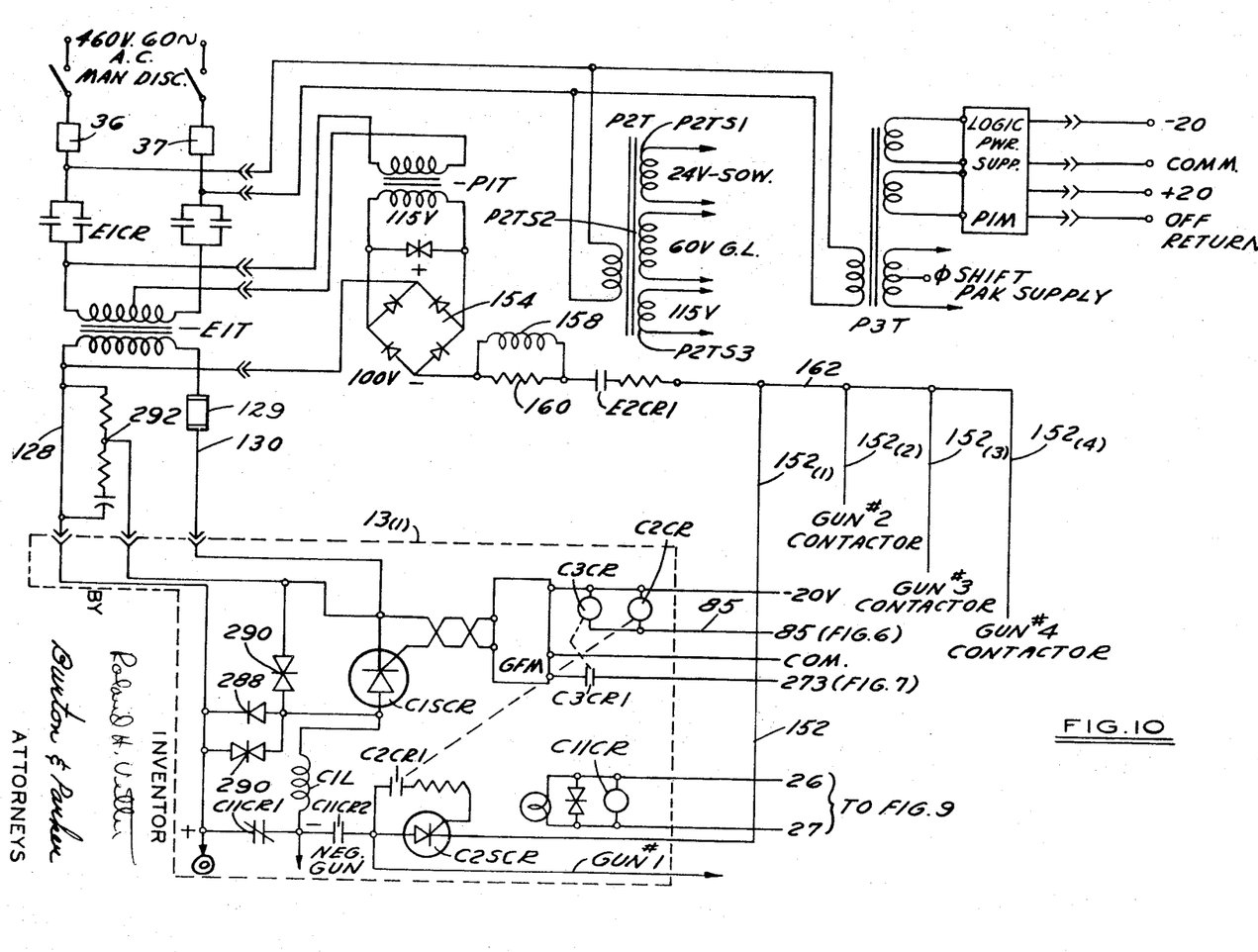
FIG. 10 is an electrical schematic representation of the transformer and power supply section of the welder, and also schematically illustrates a representative one of a plurality of gun contactor modules as provided for each gun.

With the exception of the stud on work transformer SOW which is contained in the power supply section shown in FIG. 10 and is common to all of the guns and their accessing controls, each of the accessing controls 18 contains all of the components depicted in FIG. 6. These components include a plurality of logic elements, which may be NOR gates, typified by 28; a stud on work detector circuit 28; a pair of reed contact type relays CRA and CRB having a plurality of contacts CR1 through CR6; an electronic conduction latching device in the form of an SCR, labelled GC1SCR, passing current to the gun lift coil in the representation of the gun 14 in FIG. 2; and the gun lift timing adjusting resistors 30, 31, 32 and percent heat control adjusting resistor 34 that are inserted respectively through relay contacts CR2 and CR3 into the gun lift timing drop-out circuit and into the phase shift heat control pack of FIGS. 7 and 8 of the weld controller. The gun control modules constitute the interface equipment that serves to couple a particular gun or applicator unit to the time shared sequence circuitry of the weld controller. The contacts of the reed relays CRA and CRB do the time share routing and selecting of timing characteristics peculiar to each gun.

The aforementioned NOR gates are conventional logic elements which may be of conventional RTL form of the type shown in U.S. Pat. No. 3,243,652. A single input form of NOR gate is similar to the circuit enclosed in the dashed and dotted rectangle I in FIG. 4. A multiple input NOR would include additional inputs, each containing a separate input resistor R, and connected to the point J of the circuit. This logic element provides a "1" level output therefrom only when all of the inputs thereto are at a "0" level. If any or all of the inputs is or are "1," the output is "0."

The potential levels providing operating signals to the logic controlled circuitry in this unit are common and —20 volts, of which the common level is referred to as "0" and the —20 volt level as "1." These potential levels, together with an Off-Return or logic reset signal are supplied from a D.C. logic power supply module power supply PIM contained in the welder power supply and transformer section, shown in FIG. 10. As constituted herein the welder power supply and transformer section includes the main weld transformer EIT connected to the 460 v., 60 cycle A.C. mains through a manually operated disconnect labelled MAN DISC, fuse blocks 36 and 37, and magnetic or relay operated disconnect contacts EIR, also referred to herein as the power contacts. This section also includes the pilot arc transformer PIT; a transformer P2T having three secondary windings P2TS1–P2TS3 of which P2TS1 corresponds to the aforementioned transformer SOW; and a constant voltage transformer P3T which supplies the aforementioned power supply PIM and the A.C. power for the phase shift heat control pack in the weld controller.

FIG. 10 also shows in the dashed and dotted rectangle the form of a typical one of the contactors 13, one of which is provided for each of the guns to supply pilot arc and weld current to its corresponding gun when the control apparatus of the present invention has accessed that gun and selected or prepared its contactor to receive power from the system. Each contactor as employed herein includes a main weld SCR, labelled C1SCR, that is gated from a gate firing module GFM to pass weld current from the transformer through the aforementioned shaping inductor CIL to the negative or stud contacting electrode terminal of a gun, a pilot arc SCR labelled C2SCR, and several relays C11CR, C2CR and C3CR which have been added to the contactor section and control the conditioning of the gate firing module of the selected contactor and the gating of the pilot arc C2SCR to supply pilot arc current to the gun corresponding to the contactor of a selected gun.

Figures 4, 4A, 5:
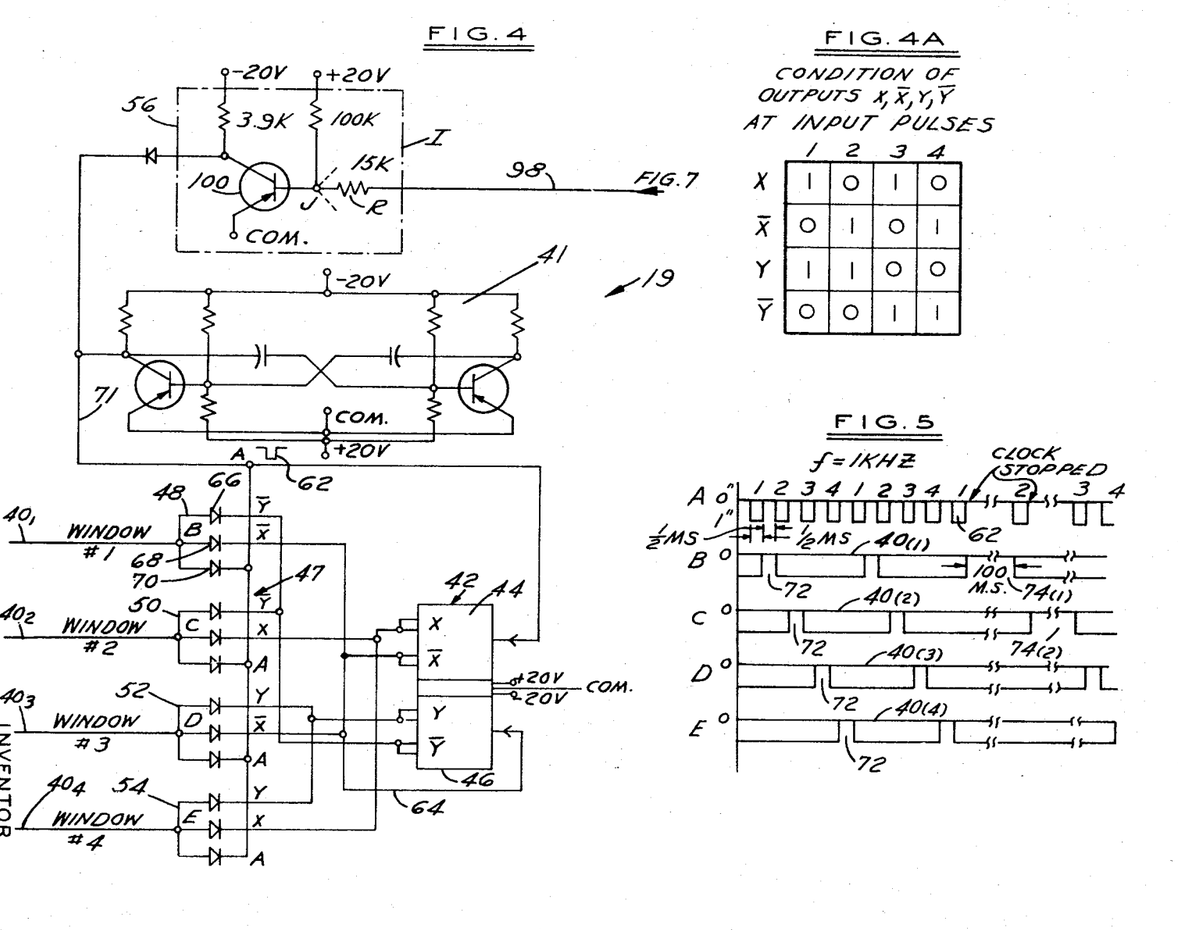
FIG. 4 is a diagrammatic and electrical circuit representation of the scanning unit employed in the multiple gun control apparatus of the present invention.
FIG. 4A is a status table of the conditions of the counter section employed in the scanning unit of FIG. 4 for the multiple gun control apparatus of the present invention.
FIG. 5 illustrates the occurrence and nature of timing pulses and the scanning "windows" at the indicated points in FIG. 4 as derived by the scanning unit of FIG. 4 employed herein.

The selection or accessing of a gun into the system is accomplished in conjunction with the scanner section 19 shown in FIG. 4 now to be described. The scanner, also called a window generator herein, provides a seqence or series of time-spaced, non-overlapping or staggered pulse "windows," a different one of which is supplied over lines 40-1, 40-2, 40-3 and 40-4 to a respectively corresponding one of the accessing or gun control units. As shown in FIG. 4 the scanner is comprised of a clock or free-running multivibrator 41, a four-stage or state binary counter 42, and a diode decoding matrix 47 having four decoding sections designated 48, 50, 52 and 54. Inhibiting means 56 in the form of a single input Nor gate, constituting a switch, is also provided for stopping and restating the clock under the control of the controller.

A form of counter suitable for use herein is described in U.S. Pat. No. 3,243,652, having a pair of sections 44, 46 each of which has an input and two outputs. The outputs from section 44 are designated as "X" and "$\overline{X}$" and the outputs from section 46, as "Y" and "$\overline{Y}$." The circuit for a typical one of the counter sections is shown in FIG. 8A of the aforementioned patent.

The free-running clock 41 produces output pulses 62 as shown at A in FIG. 5, having a pulse repetition rate of 1000 or 1K "Hz.", for example, and having a pulse width or on-time of ½ millisecond in duration separated from the following pulse by a ½ millisecond off-time interval. Each time a pulse 62 is applied to the counter section 44, the unit changes its output condition. When the "X" output is at "0," the "$\overline{X}$" output is at "1." When the next clock pulse 62 is applied, the "X" output changes to "1" and the "$\overline{X}$" output changes to "0." The output from "$\overline{X}$" is applied through line 64 to the input of counter section 46. The outputs "Y" and "$\overline{Y}$" remain in their initial conditions for the first two clock pulses and change condition only when the output "$\overline{X}$" changes from "1" to "0," or at every other time a pulse is applied to unit 44.

The input to diode 66 of window 1, decoder 48 is from the "$\overline{Y}$" output of counter section 46, and the input to diode 68 is from the "$\overline{X}$" output of counter section 44, while the input to diode 70 is from the clock generator 41 through line 64. As indicated in the counter status table of FIG. 4a, at the end of pulse No. 1, the "$\overline{X}$" and "$\overline{Y}$" outputs are both at "0" level. At the same time, the input to diode 70 from the clock generator is also at "0" level. A "window" 72 of half the width of the clock period, corresponding to the off time period of the designated clocking cycle, thus appears at the output of diode matrix 48 on line 40-1, signifying a "0" potential level condition thereon, as indicated in FIG. 5.

The output of the decoder 48 is applied over line 40-1 to one of the inputs of a multiple input accessing Nor gate 1C of the gun #1 accessing control of FIG. 6. Provided that all the other inputs to the gate are also at "0" level, this completes a circuit from the +20 v. positive input bias circuit, which is similar to that shown in block 56 of FIG. 4, of the Nor gate 1C to the output of the matrix 48 being held at the "0" level output of the "$\overline{X}$" and "$\overline{Y}$" terminals of the window generator and results in turning off the transistor in the gate. The output of the gate will be at the −20 v. level on the collector of the transistor therein, signifying a "1" logic level output from the gate. When any of the inputs to decoder 48 are at a "1" level, the "1" level appears at the output of the decoder and is applied to its Nor gate 1C providing a negative (−20 v.) signal to the input of the gate. A "1" level input to the Nor gate overcomes the positive bias on the input thereof and results in turning the transistor on, thereby placing the output from the gate at common or "0" logic level.

As indicated in FIG. 4, the inputs to decoders 50, 52, and 54 have at least one "1" level input at the end of clock pulse 1 when the inputs to decoder 48 are all of "0" level. Hence, no windows appear at the outputs of decoders 50, 52 and 54, which supply a "1" level oput therefrom to the input of the accessing gate 1C of their respective gun control units. Accordingly, these units effectively are locked out from gaining access to the weld controller and power supply, and accessing of these units is prevented even though the units are in an otherwise ready-to-weld or demand requesting condition.

While equal on and off pulse times are shown for the clock oscillator, other complementing fractional periods and clock rates other than that specified may be employed. The off time of the clock pulse during which the window is generated need only be of sufficient width or time duration to permit the logic and/or relay elements employed in the system to switch or operate and gain access to the system while the window is open. When a gun has gained access to the system, the window is extended as later explained for a period corresponding approximately to the duration of the welder controller cycle. The use of a high or fast scanning rate in relation to the duration of the welding cycle enables a rapid accessing of the guns into the system.

In addition to the occurrence of a window at the input of an accessing NOR 1C of a gun control unit, the other inputs to that NOR must also be present, i.e., at "0," to place it in operative condition signified by a "1" level output therefrom, for accessing its corresponding gun to the welder controller and power supply. These conditions include the closing of the gun trigger switch 22 by the operator and a stud position actuated angularity switch 24 in the gun, a stud-on-work detector signal indicating that the stud is on the work, and a signal from the feeder memory or controller circuit 314 of FIGS. 11 and 12 indicating that the feeder cycle, comprising the feed, transfer and loading of a stud to a gun, has been completed.

Figure 9:
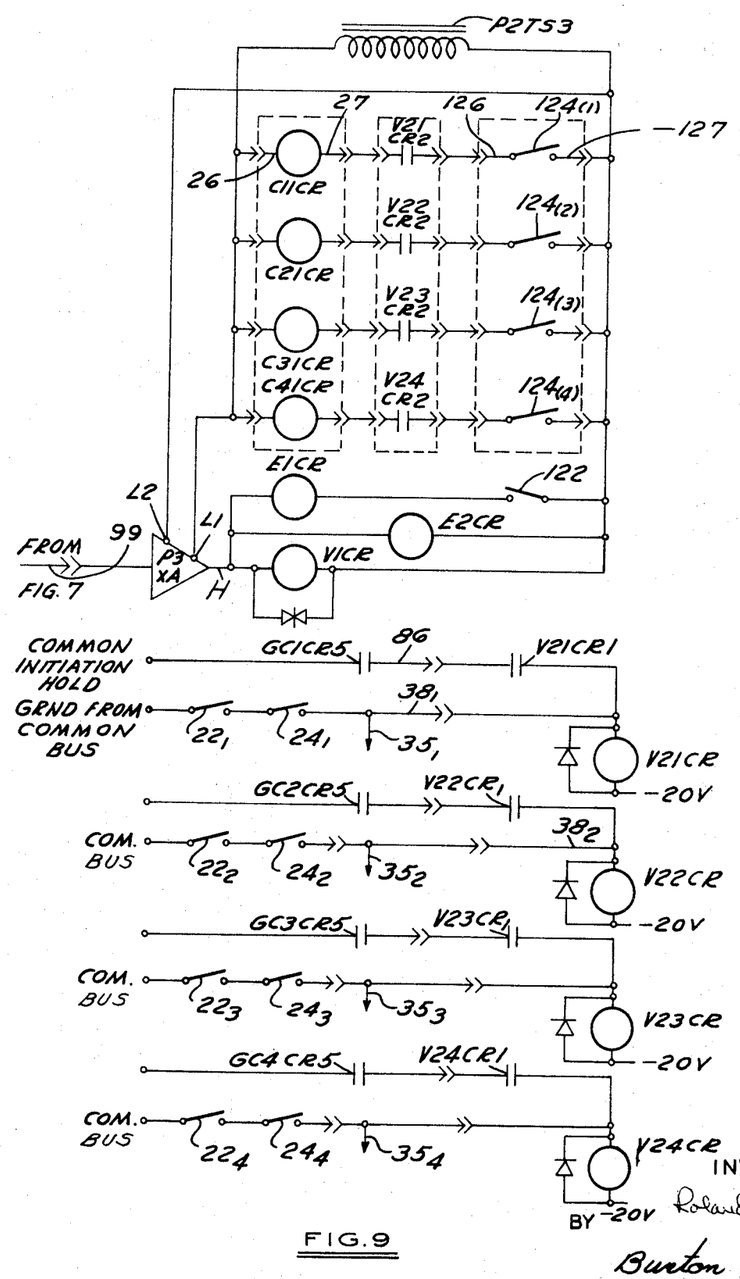
FIG. 9 is an electrical schematic circuit diagram of initiation control circuitry for the magnetic disconnect and sequence controls associated with the weld controller as modified for accommodation of a multiplicity of guns and including safety controls that have been added thereto.

The gun switches 22 and 24 are connected in series, as indicated in FIG. 9, and when actuated, supply ground from the common bus over line 35 to place one of the inputs of the accessing NOR 1C of the control unit for that gun at a "0" level. The closing of the trigger switch 22 and angularity switch 24 of a gun also supplies ground from the common bus through the switches and line 38 to energize an initiation relay, as V21CR, which is shown in FIG. 9, and is associated with gun #1. Corresponding relays V22CR, V23CR, V24CR are provided for the other guns in the four gun control apparatus illustrated herein.

Relay V21CR closes its contacts V21CR2 to energize the coil of a safety relay C11CR, which is physically contained in the contactor panel 13(1) of FIG. 10 for gun #1 and has its leads brought out therefrom over lines 26, 27 for connection in the circuitry shown in FIG. 9. A separate one of these safety relays C11CR–C41CR is provided for each gun. Each of the safety relays is shown as having a set of normally closed contacts, as C11CR1, and a set of normally open contacts, as C11CR2, which are contained in the corresponding gun contactor circuit as shown. The contacts are discretely placed in the contactor circuit and serve to protect an operator of an inactive gun against shock hazards from leakage currents and possible malfunctions of the weld current SCR (C1SCR) and pilot arc current SCR (C2SCR) when a gun is inactive and is not against the workpiece and another gun is drawing weld current from the common weld transformer.

The contacts C11CR1 when closed provide a near short circuit across the welding cables at all times except during the interval of a weld cycle of a selected gun and prevent a possible shock hazard to the operator of an unselected gun that may result from leakage current through or a failure of the weld current switch, C1SCR. The weld SCR is a high current device in which a substantial leakage current measured in milliamperes is possible. Since power must be supplied to the welding transformer at all times that at least one gun is welding, then it is possible to obtain a shock from an inactive gun. The safety switch contacts C11CR1 prevent this possibility. In the event of a failure of the main weld SCR, the current passed through the safety contacts of an inactive gun would cause the fuse 129 to open in the secondary circuit of the main weld transformer.

The normally open contacts C11CR2 prevent the flow of leakage current to an inactive gun from the pilot arc C2SCR and would also block the flow of the pilot arc current in the event of a malfunction of C2SCR.

Upon the operation of the above mentioned relays and the opening of the shorting safety contacts C11CR1 across the terminals of a selected gun, say gun #1, the stud-on-work signal can now be generated. This signal is developed by the aforementioned stud-on-work detector circuit 29 in which the stud-on-work secondary transformer section P2TS1 is placed in the detector circuit of and by a gun touching the work to provide power to the transformer 80. A separate transformer of this character is contained in the detector circuit of each accessing control unit. The negative output developed by the half wave rectifier output section connected to the secondary of transformer 80 results in a negative or "1" voltage level at point M connected to one input of the double input NOR gate 1F. Gate 1F then supplies a "0" level output to the stud-on-work input of NOR 1C.

Figure 11:
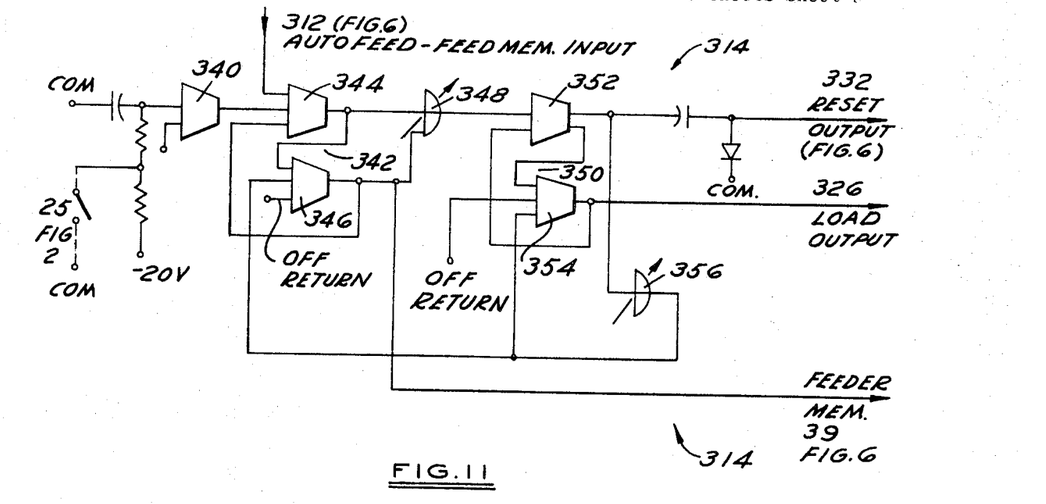
FIGS. 11 and 12 are diagrammatic representations of the feeder memory feeder controller and of the feed control components operated from the controller and associated with a different one of the guns.
Figure 12:
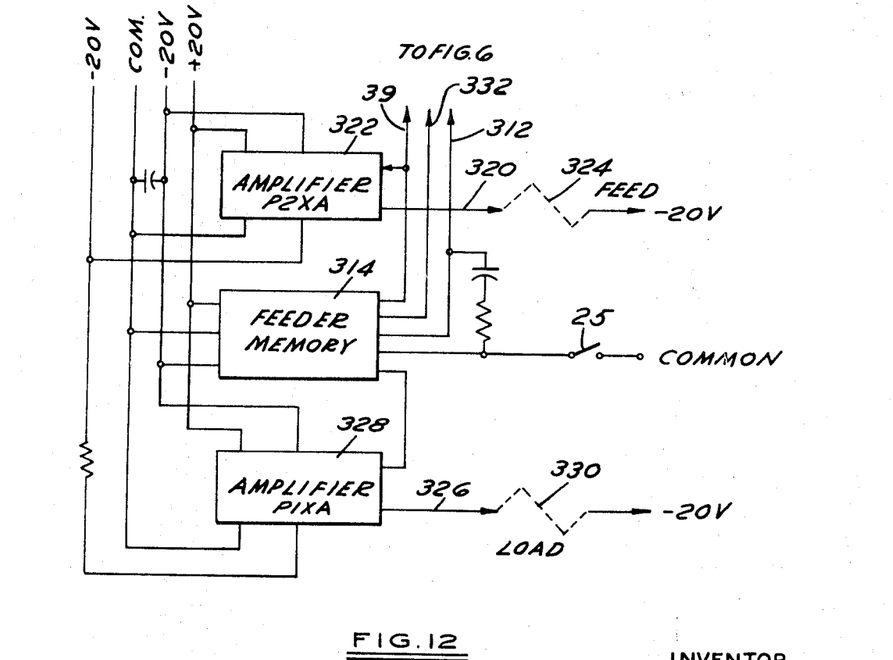

Assuming that the stud feeder apparatus associated with this gun has completed its operation, the feed cycle completion detector, which is served by the feeder memory 314 shown in FIGS. 11 and 12, supplies a "0" level signal over line 39 to the third input of NOR 1C. With the occurrence of the window at the remaining input of the NOR 1C and the aforementioned other conditions, all of its inputs are at "0" level, whereby NOR 1C is placed in its access enabling condition represented by a "1" level condition at its output. This signal is supplied over line 82 to the master memory section of the weld controller and through conductor 83 to an inverter served by a single input NOR element 1B. NOR 1B thus supplies a common level output potential over line 84 to energize the reed relays CRA and CRB within the gun control unit and over line 85 to energize the relays C2CR and C3CR in the contactor module in FIG. 10 corresponding to the selected gun. The energization of the reed relays CRA and CRB results in the closing of the contacts CR1–CR6 associated therewith, of which contacts CR5 provide an initiation hold common circuit over line 86 through the now closed contacts V21CR1 to hold the initiation relay V21CR energized.

Figure 7:
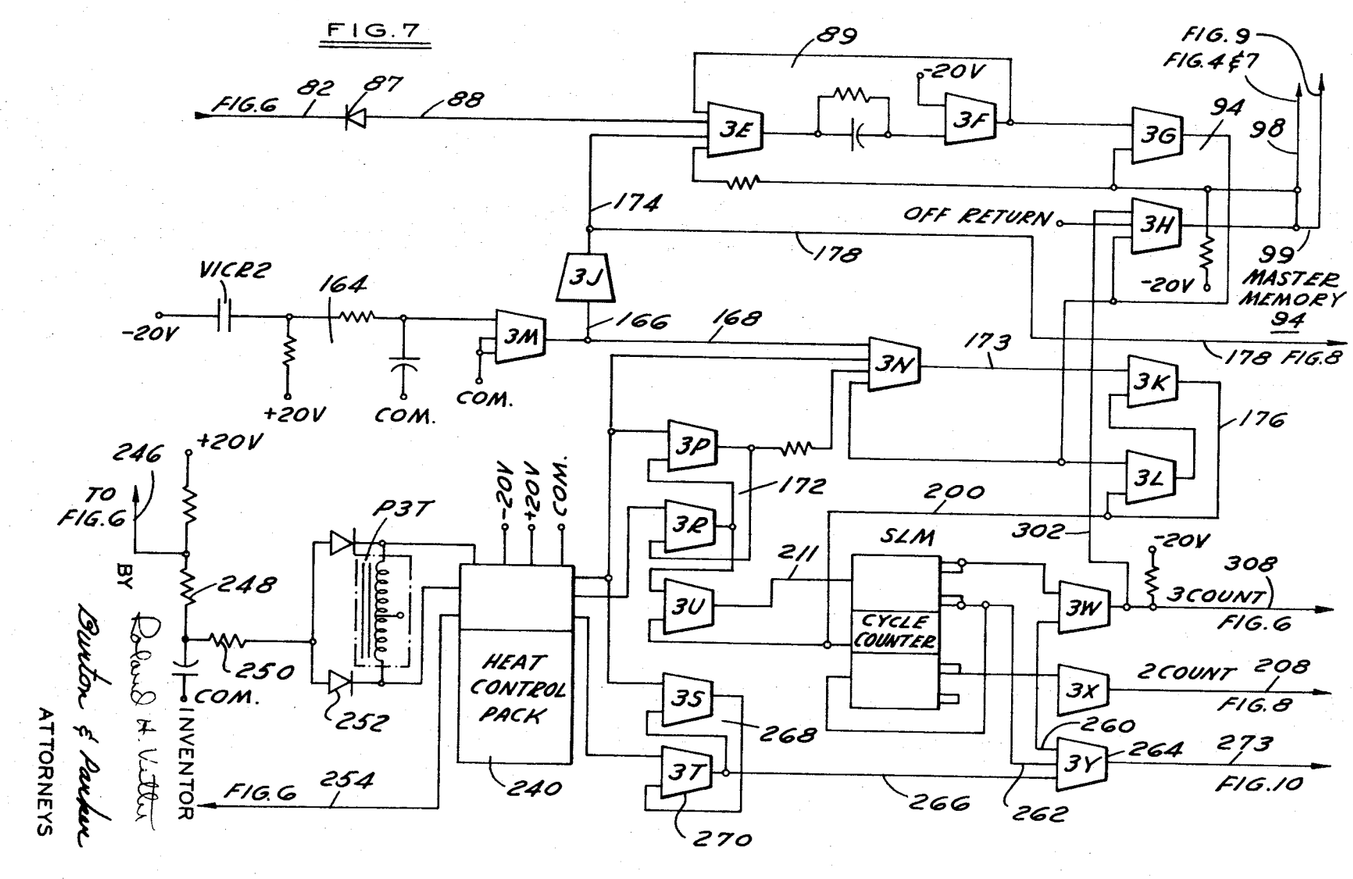
FIGS. 7 and 8 represent the schematic electrical circuit of the principal portions of the weld controller shared by several guns or weld applicator units.

The "1" level output supplied from NOR 1C to the time shared welder sequence controller is supplied through diode 87 and over line 88 to a one-shot multi-vibrator, which is indicated at 89 in the weld controller section of FIG. 7 and is comprised of NORS 3E and 3F, connected as shown. A single "1" level pulse of short duration is supplied from the output of the one-shot 89 and is applied to the master memory 94, which is a switchable bistable device comprised of cross-coupled NOR gates 3G and 3H, to place the output of 3G at a "0" level. NOR 3H receives a "0" level signal from 3G and supplies its resulting "1" output over line 98 to turn on the PNP transistor 100 of the clock inhibit circuit 56 of FIG. 4, resulting in holding one side of the clock generator at common level potential and in stopping the clock at the end of pulse #1. Line 98 is also connected to the input of an inverter served by NOR 9F (FIG. 6) whose "0" output is supplied through contacts CR1 to provide a hold circuit for the routing relays CRA and CRB in the accessing control unit and for the contactor selecting and conditioning relays C2CR and C3CR in the contactor.

The above-described stopping of the clock with the selection of gun #1, thus effectively locks out the remaining guns which then must wait until the clock is released to advance the counter and supply of "0" signal from decoders 50, 52 and 54 before any one of the remaining guns can have access to the system. The scanning of the guns occurs in sequential order in FIG. 5 with only one gun being scanned at a time. Stopping the clock effectively extends the window 72 as indicated at 74 to a period corresponding to the operational cycle of the weld controller upon or near the completion of which the clock is released as will be later apparent.

A "1" level output from the master memory 94 of the controller section, shared by all of the guns, is also applied over line 99 to amplifier P3XA of FIG. 9. This amplifier is supplied with the Square D Welder Controller and is conventional commercially available A.C. amplifier that effectively connects the L1 side of the A.C. line from the secondary section P2S3 of transformer P2T to point "H" to permit energization of the relays V1CR, E2CR and the magnetic disconnect relay E1CR of FIG. 9. A weld-no-weld switch 122, shown in series with relay E1CR, must be closed in order for this relay to be energized and, when open, enables the controller to be sequenced through a weld controller cycle without making a weld. The switches 124(1–4) are gun inhibit switches, one of which is provided for each gun, and enable selective removal of an associated gun from the system. Each inhibit switch is contained in its own or corresponding gun control unit and is connected to the associated elements shown in FIG. 9 over conductors 126, 127.

The energization of the disconnect relay closes its contacts E1CR in FIG. 10 to supply 460 v. A.C. power to the welding transformer E1T and to the pilot arc transformer, which cannot be energized until this time. Relay E2CR, energized with relays E1CR and V1CR upon the actuation of amplifier P3XA from the master memory of the weld controller, closes its contacts E2GR1 in FIG. 10 to provide a circuit through line 152 from the pilot arc bridge rectifier 154 to the pilot arc switch constituted by C2SCR contained in the contactor section of the selected gun. Contacts C2CR1, closed by the previous energization of relay C2CR from NOR gate 1B of the accessed gun control unit of FIG. 6, complete the gate circuit to C2SCR to allow C2SCR to fire. Inductance 158 and resistor 160 comprise a smoothing circuit for filtering the output of the rectified D.C. pilot arc current.

At this time corresponding to point P in FIG. 3, gun #1 has acquired exclusive access to the controller, its contactor has been selected, and pilot arc current is being provided thereto. The stud in this gun is still in contact with the work and must be retracted therefrom in order to draw a pilot arc between the stud and workpiece. Retraction of the stud is accomplished by the energization of the gun lift coil of the selected gun from the gun lift power supply shown in FIG. 8, in which the contacts V1CR1 have been closed by the aforementioned energization of the sequence delay relay V1CR, the energization and closure of which has a random variation, like that of the and similarly energized A.C. operated power contactor or main disconnect relay E1CR, as indicated in FIG. 3.

The contacts V1CR2 shown in FIG. 7 of the sequence delay relay V1CR have now also closed to provide a "1" level input from the —20 v. source to the NOR gate 3M through RC filter network 164, which provides some slight additional electrical delay to the signal passed through contacts V1CR2 as well as affording some noise and contact bounce suppression. The output from the filter is connected to an input of Nor gate 3M to supply a "0" level signal over line 166 to inverting Nor 3J. The resulting "1" level output from Nor 3J is applied over line 178 to turn on the PNP transistor 181 of the gun lift energizing and drop-out timing circuit 180 of FIG. 8, producing a pulse output when condenser 182 discharges through line 184 to trigger SCR 186 contained in this circuit.

Firing the SCR 186 completes a circuit from the negative, common returned terminal of the full wave bridge rectifier gun lift power supply 190 over line 192, conductor 193, through the fired SCR 186, conductor 194, 195 and line 196 to one side of the gun lift coil 23 of the selected gun. Line 197 from the other side of the coil is applied through GC1SCR of FIG. 6 (also shown in dotted form in FIG. 8) and lines 198 and 199 to the +80 v. terminal of the gun lift power supply, which is shared by all of the guns. This energizes the gun lift coil of the selected gun, and the stud begins to lift away from the workpiece, drawing the pilot arc.

Another output from the aforementioned Nor gate 3J is applied over line 174 to block or hold the one-shot multi-vibrator 89 off and prevent it from accidental retriggering during the weld cycle. The "0" level output from Nor 3M is also applied over line 168 to one of the inputs of a multiple input synchronizing Nor gate 3N, another input to which from Nor switch section 3G of the Master Memory is also at "0." The other inputs to Nor 3N are supplied from the phase shift heat control pack 240 provided with this controller and from the zero cross memory 172, comprised of cross-coupled Nors 3P and 3R associated with the phase shift heat control pack 240, which are decoding a line frequency signal to detect a current polarity change or line zero crossing, at which time "0" outputs are provided therefrom to the remaining inputs of Nor 3N. This places all the inputs to Nor 3N at "0" level, and the resulting "1" level output therefrom is applied through line 173 to set another memory 176, which is comprised of cross-coupled Nor gates 3K and 3L and is herein called the counter memory.

A "0" level output signal from Nor 3K of the counter memory 176 in FIG. 7 is applied through line 200 to start the cycle counter SLM which is similar to counter 42 FIG. 4 and is contained in the portion of the sequence controller shared by all of the guns. The cycle counter functions to count the cycles of the 60 cycle A.C. power supplied to the welding transformer after the gun lift coil has been energized and the pilot arc has been established, as described above. An output through line 211 from the circuit of the NOR gates 3P, 3R and 3U of the phase shift heat control pack 240 of the controller supplies a signal to the cycle counter at the instant when the alternating line voltage is at "0" crossing potential. The "0" output from the counter memory 176 starts the counter when the positive half cycle drops to "0" at point (0) of FIG. 3. After the second cycle has been counted at point (2), a "0" output, representing a 2 count from the counter, is applied to the NOR gate 3X. A "1" output from the gate 3X is then applied through line 208 to turn off NPN transistor 210, in the gun lift coil drop-out timing circuit of FIG. 8, starting the gun lift coil drop-out time.

Figure 8:
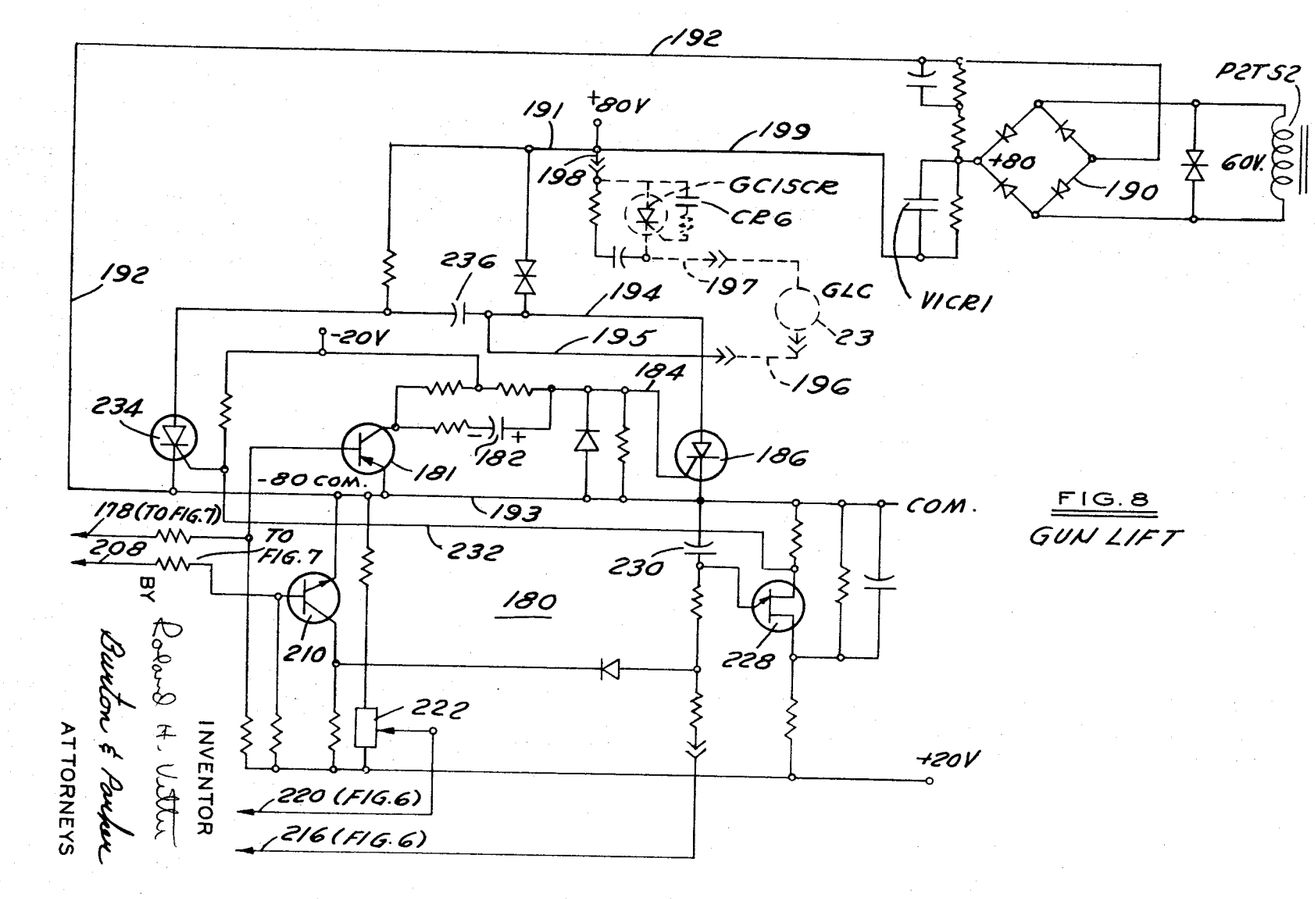

Gun lift coil 23 timing is determined by variable resistors 30, 31 of FIG. 6 which are placed in the timing circuit of FIG. 8 through lines 216, closed contacts CR2 of relay CRA, and line 220 which is connected to resistor 222 in FIG. 8. The switch 33 in FIG. 6 cuts in or out resistor 3 to add 5 ms. delay to the timing range. When the transistor 210 in the gun lift coil timing circuit of FIG. 8 turns off, unijunction transistor 228 turns on from the positive charge built up in condenser 230. A positive voltage from unijunction 228 is applied through line 232 to turn on SCR 234. Previously charged capacitor 236 discharges through line 198 to the gun lift coil SCR (G1SCR) driving its anode negative to stop conduction and de-energize the gun lift coil. The stud is then driven under the power of a compressed spring in the gun and is plunged toward the workpiece as indicated at the point SP in FIG. 3, designated as Start Stud Plunge and shown herein as occurring prior to the initiation of the weld current as described below.

Current supplied from the welding transformer EIT to weld the stud to the workpiece is controlled by the aforementioned phase shift heat pack circuit 240 supplied with the controller. The operation and structure of a form of phase shift heat control circuit is also described in U.S. Pat. No. 3,258,697. The heat pack unit 240 controls the initiation of the weld pulse and generates, at the appropriate zero crossings, the line synchronization pulses supplied from the zero cross memory 172 associated therewith and mentioned above.

At the cycle count of two, the inputs 260 and 262 to NOR gate 3Y of FIG. 7 are at "0" and the input 266 is at "1." The input at 266 is determined by the condition of the heat control memory 268, comprised of cross-coupled NOR gates 3S and 3T, associated with the heat pack. The memory 268 is switched each half cycle by outputs of the heat pack at a time determined by the setting of the present weld current resistor 34 of FIG. 6. A resistor of this character is provided in each of the accessing control units through which it is connected over line 246 to resistors 248, 250 and diode 252 in the heat pack and back over line 254 to the closed contacts CR3 of relay CRA in FIG. 6. At point 272 of FIG. 3, a phase shifted "1" output from the heat pack applied to the heat control memory gates 3S and 3T produces a "0" output that is applied to the input 266 of gate 3Y. All the inputs to gate 3Y are now "0," and a "1" output is applied through line 273 to the gate firing circuit GFM in FIG. 10 in which contacts C3CR1 and C11CR3 were closed when relays C3CR and C11CR, respectively, were energized, as previously described.

A gate firing module is contained in each contactor section 13(1–4) herein and is a commercially available component supplied with the welder controller. Essentially, it is a pulse forming device for triggering an SCR, various forms of which are well known. Upon receipt of the logic triggering signal from 3Y, an output from the gate firing module applied between the gate and cathode elements of the main weld SCR, fires the main weld SCR (C1SCR), completing the circuit through line 130 and the stud and workpiece and line 128 to the secondary of the welding transformer. A welding current, shifted in phase from the start of the corresponding voltage alternation, begins to flow through the arc between the stud and workpiece. The termination of the weld sequence is signalled when the cycle counter attains the count of 3, although the weld current continues to flow by reason of the aforementioned phase shift and the effect of the inductor and discharge diodes, discussed below.

The stud contacts the workpiece at the stud plunge point labelled PP in FIG. 3, which is effectively the end of the weld current cycle. At this point or time, the resistance and voltage between the stud and workpiece drops to a low value, and the inductor CIL in the activated contactor section discharges through diode 288, the elements CIL and 288 serving to protect the main weld C1SCR from current surges as well as to shape the form and continue the flow of the weld current, as previously mentioned. The thyrector 290 protects the secondary of the welding circuit line from voltage surges. The voltage dividing circuit indicated at 292 is used to reduce transients from the transformer secondary.

At the cycle count of three indicated at (3) in FIG. 3, a "0" output from the cycle counter SLM of FIG. 7 is applied to NOR gate 3W. A "1" output from gate 3W is applied through line 302 to reset the master memory gates 3G and 3H. A "0" output from the NOR 3H of the reset master memory is applied through line 98 to remove the inhibiting potential from the clock oscillator 41 of FIG. 4, which restarts the flow of clock pulses therefrom to continue the progressive scanning of the gun accessing control units.

The "0" output from the master memory is also applied through line 99 to the amplifier P3XA of FIG. 9, resulting in de-energizing relays E1CR, V1CR, and E2CR and in the subsequent opening of magnetic disconnect switch contacts E2CR1, V-CR1 and the various other contacts operated by the above relays after the mechanical dropout time of these relays, whereupon the power to the welding transformer, pilot arc transformer and gun lift coil is shut off. The system is ready to start another weld cycle while the feeder memory is going through an operation as described below controlling the feeding of another stud to the just operated gun, gun #1.

The feeder memory controls the operation of the feed and transfer valves of an automatic feeder (not shown) for automatically feeding and transferring a stud to a gun and of a load valve, which controls the loading of a stud in the gun of the character mentioned herein. An additional output from the feeder memory supplies a sustained "1" level output voltage therefrom to the NOR 1C of the accessing control unit for the gun, with which the feeder is associated, to prevent operation of the gun from the controller during a feed transfer and load operation.

The feeder memory 314 together with the D.C. amplifiers 322 and 328 operated therefrom are shown in the organization of FIG. 12, a complete and separate set of the units 314, 322 and 328 shown therein being provided for each gun. The amplifiers 322 and 328 are conventional D.C. drive amplifiers commercially available with welder controller equipment of this character.

The composition of the feeder memory circuit member 314 is symbolically represented in FIG. 11 and comprises essentially a first NOR gate element 340 supplying a NOR memory 342 formed of a pair of cross-coupled NOR elements 344, 346. An input to NOR 344, labelled Auto Feed, is connected in a circuit over line 312 through the contacts CR4 in FIG. 6 and line 308 to the output of NOR 3W of FIG. 7, the output from which at the cycle count of 3 starts the operation of the feeder circuitry by supplying a "1" level signal over the just described circuit to the Auto Feed input terminal of the feeder memory device 314. An output from NOR 344 is supplied to an electronic timer 348 and the output from NOR 346 is supplied as a Feeder Memory Output signal to the input of D.C. amplifier 322 and over line 39 to the feeder input terminal of NOR 1C of accessing control 18(1) of FIG. 6 to prevent that NOR element from accessing gun #1 to the weld controller during the feed operation taking place in Gun #1, which has just completed its weld cycle. The D.C. amplifier 322 (P2XA) provides a circuit through the solenoid of the pneumatic feed valve indicated at 324 to the −20 v. source, energizing the solenoid and causing a stud to be fed and transferred from the feed hopper.

The timer 348, which may be a conventional unijunction timing circuit and amplifier, supplies its output to another memory or bistable switching element 350 formed of cross-coupled NORS 352 and 354. The output of NOR 354 is supplied to the Load Output terminal from the feeder memory connected to amplifier 328 (P1XA) to supply common level potential to one side of the solenoid of the pneumatic load valve indicated at 330 connected to the −20 v. source, thereby energizing the solenoid to cause a stud to be loaded into position in the gun.

The output from NOR 352 is supplied to another timer 356 whose output is shown connected to one input terminal of NOR 346 and NOR 354. Another output, labelled *Reset Output,* taken from the capacitor diode circuit supplied from NOR 352, is connected over line 332 and applied to the NOR memory gates 1D and 1E in FIG. 6 to provide a "0" output to NOR 1C and place it in condition for the next weld operation at the end of the load operation.

In order to load the first stud into the gun, or in the event of a feeder malfunction, the manual load or recycle switch 25 located in the gun may be depressed to cause the selected feeder memory feed controller associated with that gun to energize the feed and transfer and load values independent of the weld sequence.

As described above, the gun accessing control for the gun that has just completed a welding cycle is inhibited while the feeder cycle is taking place for that gun. However, the restarting of the clock 41 permits the counter 42 to continue the count to the decoder and to advance to its next state or count from the state or count in which it was left when the clock was inhibited by the previously accessed gun. The decoding means thus continues the development of the output window pulses in a defined order at the scanning rate of the clock until the next selected and ready gun unit stops the clock while the latter unit has access to the system welding controller and power supply. Thus, the several units are operable in overlapping total cycles, as earlier defined herein, during which a welding cycle for one gun may be initiated while the feeding cycle is simultaneously taking place for another gun that has completed its welding cycle operation.

While a predetermined order of scanning has been described herein, other scanning orders may be employed, including random scanning orders as may be obtained with a random number control generator, for example.

What is claimed is:

1. In combination with a welding apparatus power supply system and a welding controller that provides a predetermined operated sequence of welding control functions characteristic of the particular form of welding for which the welding apparatus is provided:
   a plurality of welding applicator units,
   selectively operable means for each unit rendering it in a ready-to-weld, power requesting condition,
   means for effectively scanning the several units and,
   selectively operable accessing means connected to each unit and the welding controller and power supply and responsive to the scanning of a conditioned unit, said accessing means selecting and accessing a conditioned unit to the controller and power supply and interlocking the other units against access thereto for a period of time no less than that of the sequence of operation of the welding controller, whereby the same welding apparatus power supply and welding controller may be time-shared by a plurality of weld applicator units, and
   the welding apparatus is of the drawn arc character wherein a low intensity pilot arc current is supplied to an applicator unit to establish an arc path for a high intensity welding current subsequently initiated from the welding controller.

2. The combination in accordance with claim 1 wherein the welding apparatus includes a source of power to supply the pilot arc and the said control apparatus also affords operation of the plurality of applicator units from the pilot arc power source on a time sharing basis.

3. In combination,
   a plurality of weld applicator units,
   a source of welding power of a capacity to operate a single applicator unit,
   a time shared controller providing a predetermined sequence of welding functions for each applicator unit and including welding parameter control means specifying the welding parameters for each unit, and time sharing control means connected to each applicator unit and to the time shared controller for time sharing operation of the common welding power source and controller between the plurality of weld applicator units in time displaced welding cycles.

4. The invention of claim 3 wherein the welding parameter control means is adjustable to specify different welding parameter requirements for each applicator unit.

5. In combination,
a plurality of stud welding applicator units for welding a stud to a workpiece,
a feeder controller for each applicator unit controlling the feeding of a stud to an applicator unit,
a single source of welding power of a capacity to operate a single applicator unit,
a welding controller providing a predetermined sequence of control functions for initiating and completing a welding cycle with an applicator unit from said source of weld power, and control apparatus connected to each applicator unit and feeder controller and to the source of weld power and welding controller for time sharing operation of the common welding power source and welding controller between the plurality of weld applicator units in time displaced welding cycles, but overlapping feeder controller operations.

References Cited

UNITED STATES PATENTS

| | | | |
|---|---|---|---|
| 2,039,851 | 5/1936 | Silverman | 219—114 X |
| 2,505,808 | 5/1950 | Strickland | 307—41 |
| 3,051,825 | 8/1962 | Rockafellow et al. | 219—108 |

JOSEPH V. TRUHE, Primary Examiner

M. C. FLIESLER, Assistant Examiner

U.S. Cl. X.R.

219—114; 307—41